United States Patent [19]

Kunert

[11] Patent Number: 4,551,372
[45] Date of Patent: Nov. 5, 1985

[54] LAMINATED SAFETY GLASS

[75] Inventor: Heinz Kunert, Cologne, Fed. Rep. of Germany

[73] Assignee: Saint-Gobain Vitrage, Courbevoie, France

[21] Appl. No.: 592,895

[22] Filed: Mar. 23, 1984

[30] Foreign Application Priority Data

Mar. 31, 1983 [FR] France ............................. 83 05326
Mar. 31, 1983 [FR] France ............................. 83 05328

[51] Int. Cl.$^4$ ............................................ B32B 23/02
[52] U.S. Cl. ...................................... 428/38; 52/789;
428/40; 428/58; 428/60; 428/78; 428/81;
428/192; 428/437
[58] Field of Search .................... 928/38, 34, 40, 57,
928/58, 60, 78, 81, 99, 192, 426, 437; 156/107,
108; 52/201, 789

[56] References Cited

U.S. PATENT DOCUMENTS

| | | | |
|---|---|---|---|
| 2,533,474 | 12/1950 | Koch | 156/108 |
| 2,592,262 | 4/1952 | Fox | 156/108 |
| 2,750,312 | 6/1956 | Bloom, Jr. et al. | 428/38 |
| 3,061,490 | 10/1962 | Ryan | 428/38 |
| 3,081,205 | 3/1963 | Shorr | 428/38 |
| 3,248,273 | 4/1966 | Boicey | 428/38 |
| 3,398,040 | 8/1968 | Allen et al. | 428/38 |
| 3,549,466 | 12/1970 | Kay et al. | 428/38 |
| 3,689,356 | 9/1972 | Foreman | 156/107 |
| 4,046,951 | 9/1977 | Stefanik | 428/81 |
| 4,228,425 | 10/1980 | Cooke | 52/789 |

FOREIGN PATENT DOCUMENTS 1562792 3/1980 United Kingdom .

*Primary Examiner*—George F. Lesmes
*Assistant Examiner*—William M. Atkinson
*Attorney, Agent, or Firm*—Oblon, Fisher, Spivak, McClelland & Maier

[57] ABSTRACT

A laminated safety glass is disclosed which is comprised of first and second glass sheets, the second glass sheet being smaller than the first, the peripheral edges of each sheet defining between them a stairstep structure. The face of the larger glass sheet defining the stairstep structure is coated with an opaque material, on which is deposited an adhesive, which forms a water-tight seal over the plastic insert between the glass sheets, thereby preventing deterioration of the plastic insert qualities.

Preferably, a primer, for improving adherence, is deposited on the opaque sheet before the adhesive bead is deposited, and the bead exhibits flange or tongues in the direction of the bay in which the glass is to be mounted, to delimit the amount and position of the adhesive to be applied.

8 Claims, 5 Drawing Figures

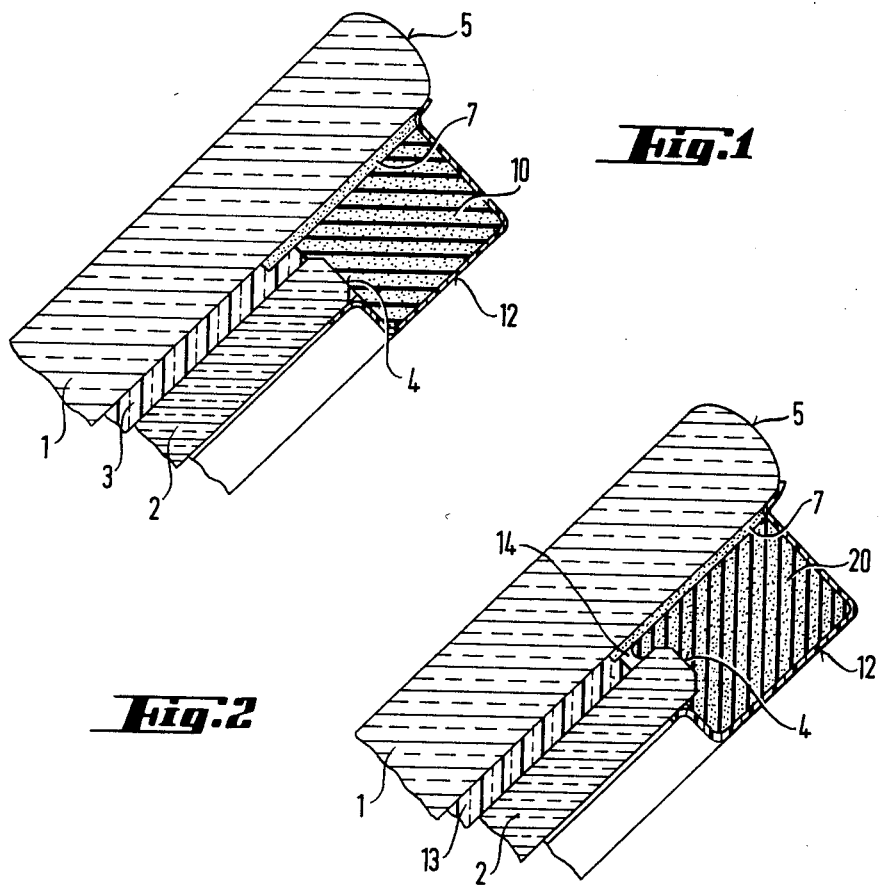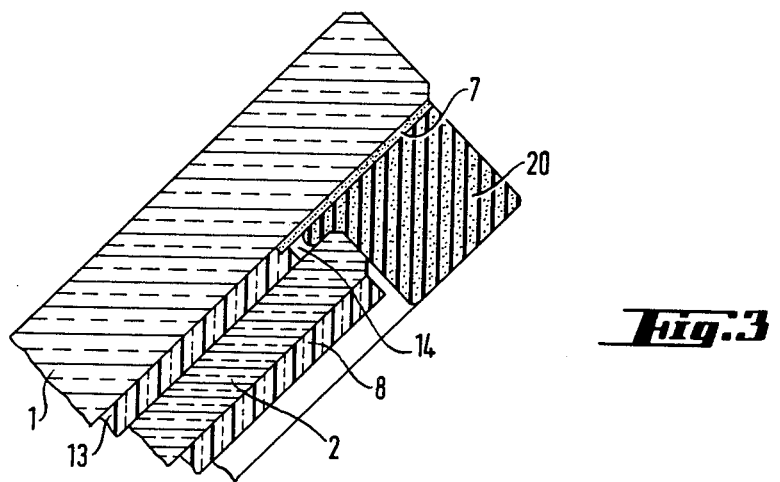

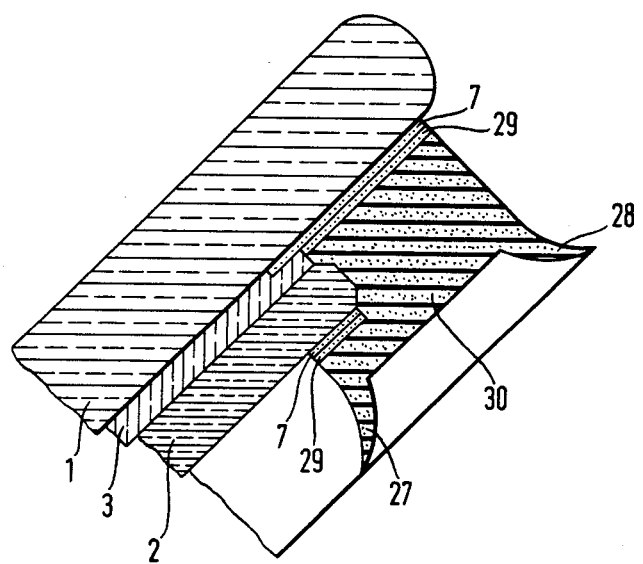

LAMINATED SAFETY GLASS

BACKGROUND OF THE INVENTION

1. Field of the Invention:

This invention is directed to a new safety glass, intended particularly to be used as a windshield for motor vehicles.

The following description will deal with the case of windshields for motor vehicles, but it is understood that the invention can also relate to safety glasses intended to be mounted in any bay of a motor vehicle or building.

2. Description of the Prior Art:

Windshields now currently used are so-called "laminated" safety glasses, i.e., made up of two or more glass sheets glued by one or more plastic insert sheets, this insert generally being a polyvinyl butyral sheet.

For simplicity, the following description will refer to simple laminated glasses, i.e., glasses comprising two glass sheets glued by a plastic insert sheet, without, however, excluding from the scope of the invention other types of laminated glasses.

Like other plastics that can be used in this application, polyvinyl butyral is known for its sensitivity to moisture. When water vapor diffuses from the edge of the glass into the insert sheet, the plastic that it comprises absorbs the water. A reduction in the adherence of the insert to the glass occurs. Further, the phenomena of opacification of the glass appears on the periphery. This water absorption can occur both before mounting of the windshield in the body of the vehicle, for example, during shipment from the manufacturing plant to the mounting site and during storage. Diffusion of the water can also occur when the glass has already been mounted in the body, if care has not been taken to make sure that the fluid tightness at the frame is sufficient to prevent any penetration of moisture. In tropical countries, for example, laminated windshields are subjected to particularly harsh conditions. Consequently, in these hot countries with a high degree of humidity in the air, the phenomena of opacification and delamination are greatly increased.

The invention therefore has as its object to provide glasses, particularly laiminated windshields whose edges are made as fluid-tight as possible in regard to the moisture that might penetrate into the plastic insert, either before mounting of the windshield in the vehicle body of afterward. Simultaneously, the proposed fluid tightness means facilitate and simplify installation of the glass in the bay, particularly its mounting by gluing.

SUMMARY OF THE INVENTION

To achieve these objects, the glass according to the invention are such that the edges of the glass sheet directed toward the passenger space of the vehicle or interior of the compartment defined thereby are offset in relation to the edges of the glass sheet directed outward. In other words, the inner glass sheet exhibits smaller dimensions than the outer glass sheet and is glued to the latter, forming a stairstep structure on the periphery.

Further, according to the invention, a peripheral strip of material that is opaque to UV rays is deposited on the periphery of the inner face of the larger glass sheet, i.e., the glass sheet directed toward the outside of the vehicle, and on this strip is deposited a continuous bead that fills the space in the stairstep and which comprises an adhesive material that prevents diffusion of water vapor in the insert sheet. The dimensions of the bead are such that it can serve, during mounting of the windshield in the body, to fasten it by gluing to the fold of sheet metal of the body provided for this purpose. It is also essential that the bead be in contact with the edges of the inner glass sheet to assure the desired fluid tightness.

The adhesive bead can be deposited in the step immediately after making of the windshield at the manufacturing plant. In this way, a total fluid tightness of the plastic insert sheet toward the atmosphere is assured immediately. Thus, not only is any alteration of the insert sheet by possible absorption of moisture definitely avoided during shipping and storing but also the edges of the glass, at least on the small glass sheet, are protected. This protection is particularly advantageous since these smaller glass sheets are generally thinner and consequently extremely susceptible to mechanical damage.

For the bead to be able to serve directly for mounting by gluing of the glass in the bay of the body, it is advantageous that it be thicker than the smaller glass sheet. Thanks to this structure, the bead further advantageously serves as a spacer during stacking of the glass.

The invention also offers the advantage, because of the existence of a step between the two glass sheets, filled with an adhesive that is thicker than the smaller glass sheet, of making it possible to reduce the depth of the fold of the sheet metal of the body or bay intended to receive the glass. Actually, it is always necessary to use a minimal thickness of adhesive to assure a solid bond between the glass and the body.

Through the invention, for a maintained thickness of adhesive, the depth of the fold of the bay can be reduced by the cumulative thickness of the insert sheet and inner glass sheet. Thus, it is not only possible to save sheet metal but especially to increase the angle of vision available to the driver.

According to a preferred embodiment of the invention, the adhesive bead is covered with a protective sheet or strip, for example, of paper which is pulled off just before mounting the windshield in the body.

The strip of opaque material that is deposited on the periphery of the inner face of the outer glass can, for example, consist of a layer of enamel, printed then baked on the glass. This strip not only hides from the view of an outside observer the adhesive layer that covers it but advantageously further improves the adherence of the glue to the glass sheet.

BRIEF DESCRIPTION OF THE DRAWINGS

This invention is further disclosed in the detailed description below, which refers to the FIGS. 1-4.

FIG. 1 shows a view in section of a laminated glass according to the invention in a first embodiment.

FIGS. 2 and 3 illustrate two other embodiments of the glass according to the invention.

FIG. 5 shows another embodiment of a glass according to the invention.

DETAILED DESCRIPTION OF THE INVENTION

Figure 4:
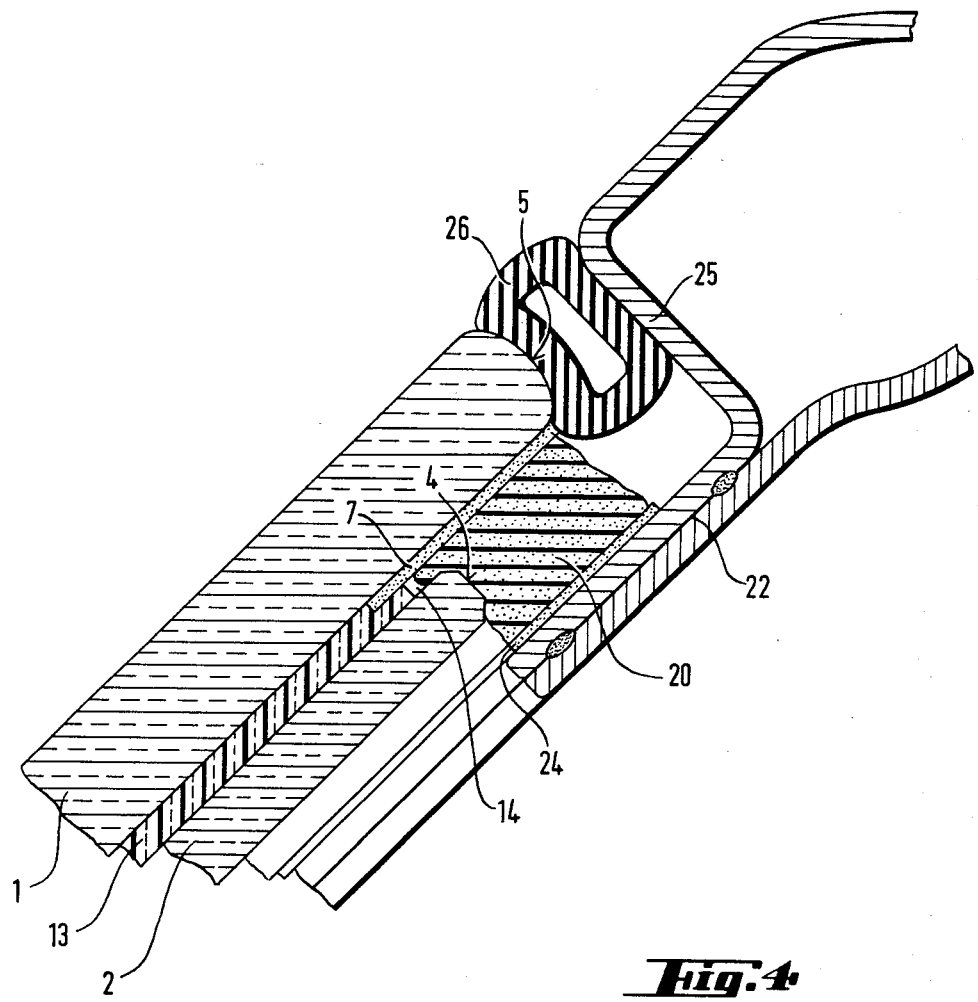
FIG. 4 shows a laminated glass windshield according to the invention after its mounting in the bay of a motor vehicle body.

The laminated glass sheet shown in FIG. 1 comprises a glass sheet 1 which, after mounting, constitutes the glass sheet directed outward, and sheet 2 which, after mounting, is directed toward the passenger space. In general, sheet 2 is thinner than sheet 1. The two sheets 1 and 2 are glued by a plastic insert sheet 3. Sheet 2 is smaller than sheet 1 so that there is a difference of about 1 to 2 cm between their respective edges 4 and 5. Plastic sheet 3, of polyvinyl butyral or other comparable material, has the same dimensions as sheet 2 and their edges are in the same plane.

On the periphery of the face of glass sheet 1 directed toward insert sheet 3, which projects beyond sheet 2, is deposited a layer 7 of opaque color, for example, a thermosetting black paste. Such pastes suitable for the application are widely available to those of skill in the art. Of the available pastes, those which exhibit a good adherence to the glue or adhesive material that is used are preferred. If necessary, before applying the paste to the glass sheet, it can be mixed with additives known in the art which improve adherence. The paste is applied in a known way, for example, by silk screening. According to a preferred embodiment of the invention, a paste is used which is applied to the glass sheet before bending and which is baked during this operation thanks to the high temperature necessary for bending process.

The step defined by edge 4 of glass sheet 2 and layer 7 is filled with an adhesive bead 10 which can be injected directly in this space by an injection nozzle. Optionally, a ground layer or adherence primer is deposited on opaque layer 7 before depositing of the adhesive bead. The adhesive material is applied to obtain a bead 10 that is thicker than the surface of glass sheet 2 and can thus serve directly for fastening of the glass to the body. Advantageously, the adhesive bead is made up of a material that for some time retains its aptitude for plastic deformation and hardens only after mounting of the windsheild in the bay. This result can be obtained, for example, by covering the adhesive bead with an airtight protective sheet 12 after the bead has been deposited.

Adhesive bead 10 can also consist of a material that hardens after application but which, nevertheless, can be softened before mounting of the windshield. For example, it can be a thermosetting material which is heated to its softening temperature before mounting of the windshield. Also, it is possible to use adhesives that can be softened or activated by treatment with a plasticizer or solvent.

According to a process that is particularly suitable for installation of such windshelds, it is possible, before mounting of the windshield in the bay, to deposit on the fold in the bay provided to receive the windshield or on the adhesive bead itself, a layer of glue that plasticizes the adhesive bead while being able to adhere thereto, so that a durable, fluid-tight bond is formed between this layer of plasticizing glue, the adhesive bead and the fold of the body bay.

The embodiment shown in FIG. 5 makes possible an alternate preferred mode of fastening the glass in the body bay. The glass comprises, as in FIG. 1, a glass sheet 1 and a glass sheet 2 as described with reference to FIG. 1. A layer is also deposited on the edge of sheet 2 to hide adhesive bead 30 totally. An adherence primer 29, as described in U.S. Pat. No., 3,779,794 is deposited on opaque layer 7. In this embodiment, adhesive bead 30 has a particular shape: it partially covers the periphery of the two glass sheets 1 and 2 and exhibits in the direction of the passenger space two tongues 27 and 28. This bead is of a material that hardens very rapidly after it is deposited, for example, of a polyurethane prepolymer. It then serves solely as an intermediary for later mounting of the glass in a bay. At the time of mounting the glass in the body bay, there is deposited, for example by extrusion, between tongues 27 and 28, another bead portion of a material compatible with the first portion. Thanks to the presence of tongues 27 and 28 which limit the amount of the second bead deposited, material is saved. The glass mounting time is further reduced, for a bead thickness identical with that used in the embodiment described with reference to FIG. 1, about half the amount of material is extruded at the time of mounting of the glass in the body bay. The smaller amount of material dries faster.

This embodiment, morever, can have variations which are not shown; the bead portion provided with tongues can, for example, not overlap the two glass sheets, but stop at the edge of the inner glass sheet. It is also possible to deposit a first bead provided with a single tongue, placed toward the inside of the glass and serving to avoid projection of the second bead.

In the embodiment shown in FIG. 2, insert sheet 13 exhibits dimensions less than those of glass sheet 2. Its edge is offset some millimeters in relation to edge 4 of glass sheet 2. This results in the creation of a groove 14 around insert sheet 13 and between the two glass sheets 1 and 2, in which a part of adhesive 20 penetrates. The presence of this groove thus assures a particularly good fluid tightness of insert sheet 13 in regard to the ambient atmosphere, since the adhesive also acting as a fluid-tight seal penetrates between the two glass sheets.

The constitutive material of bead 20 is selected by the same criteria mentioned for the example illustrated in FIG. 1.

The laminated glass shown in FIG. 3 also comprises a first glass sheet 1 directed outward and a second glass sheet 2 directed toward the passenger space, glued by a plastic insert sheet 13 that is smaller than sheet 2. Sheet 2 is smaller than sheet 1. An opaque layer 7, for example, of black enamel, is deposited on the periphery of the inner face of sheet 1 which extends beyond sheet 2. Sheet 2 is covered on the face directed toward the passenger space with a sheet 8 for protection against glass splinters, of flexible, transparent polyurethane having self-healing properties. The adhesive bead 20 is deposited in the free space or step defined by the edge of sheet 2 and that of sheet 1. The adhesive also penetrates into groove 14 which is present because of the small size of plastic sheet 13 in comparison with that of sheet 2.

In this embodiment, the invention exhibits an additional advantage that is of decisive importance for mounting the windshield described by simple gluing. It is possible to apply to opaque layer 7, a ground layer or adherence primer, not shown, before applying adhesive bead 20 without the ground layer thereby coming in contact with protective film 8. As can be seen in FIG. 3, protective sheet 8 is not in contact with any of the layers deposited on sheet 1. It has been found that the ground layer has a very harmful effect on protective layer 8 when they are in contact, which is practically inevitable with the usual processes, where the two glass sheets will have the same dimensions.

The windshields according to the invention are particularly suited for flush fitting in the body without the introduction of additional shapes or ornamental elements covering the edges of the glass. Since layer 7 already masks the adhesive layer it is not even necessary to hide it with an outside decoration. Still, since in this way edge 5 of sheet 1 can be seen, it is recommended that it be given a rounded shape.

FIG. 4 show a windshield according to FIG. 2 mounted by gluing in a body bay. To put in the windshield, a relatively fine layer 24 consisting of a glue containing solvent is applied to fold 22 of the bay. When adhesive bead 20 comes in contact with this layer at the time of mounting, they react so that the bead softens and thus can fit any possible unevennesses of layer 24. After hardening, adhesive bead 20 has formed a durable bond with layer 24. An elastic hollow seal 26 is wedged between edge 5 of the windshield and sheet metal portion 25 of the body to plug the gap that exists between them.

This invention has been disclosed with reference to particular and preferred embodiments. Particularly, dimensions and shapes have been set forth without intention to limit the invention, unless otherwise indicated. Variations will occur to those of skill in the art without the exercise of inventive faculty and remain within the scope of the invention as claimed below.

What is claimed as new and desired to be secured by Letters Patent of the United States is:

1. A safety glass suitable for mounting in an opening, comprising:
    a first glass sheet having a peripheral edge,
    a second glass sheet having a peripheral edge and a width and length smaller than that of said first glass sheet, said first and second glass sheets being glued together by a plastic insert therebetween in such fashion that said second glass sheet falls entirely within the periphery of said first glass sheet so that corresponding portions of said edges form a stairstep structure,
    the portion of the side of the first sheet facing said second sheet but not covered thereby being covered with a peripheral strip of opaque material,
    the opaque material being covered with an adhesive bead extending from the peripheral edge of said second glass sheet to that of said first glass sheet, said bead forming a water tight seal about the plastic insert, and having a thickness greater than that of the peripheral edge of said second sheet so as to serve as a fastener for mounting said safety glass in said opening.

2. The safety glass of claim 1, wherein said peripheral strip comprises an enamel deposited by silk screen techniques.

3. The safety glass of claim 1, wherein the adhesive bead is comprised of a hardenable material which is softened prior to mounting of the glass in said opening.

4. The safety glass of claim 1, wherein said plastic insert has a smaller width and length than said second glass sheet.

5. The safety glass of claim 1, wherein said adhesive bead is provided with a protective sheet that can be removed prior to mounting.

6. The safety glass of claim 1, wherein said peripheral edge of said first glass sheet exhibits a rounded shape.

7. The safety glass of claim 1, wherein said opaque strip is directly covered with an adherence improver which increases the adherence of said adhesive bead to said opaque strip, the adhesive bead being applied thereover.

8. The glass of claim 7, wherein said adhesive bead is comprised of a hardenable material and comprises two flanges extending away from the face of said first glass sheet on which said bead is deposited.

* * * * *